United States Patent
Kovács

(10) Patent No.: US 9,303,233 B2
(45) Date of Patent: Apr. 5, 2016

(54) TRANSESTERIFICATION OF VEGETABLE OILS

(75) Inventor: András Kovács, Budapest (HU)

(73) Assignee: QS Biodiesel Limited, London (GB)

(*) Notice: Subject to any disclaimer, the term of this patent is extended or adjusted under 35 U.S.C. 154(b) by 93 days.

(21) Appl. No.: 12/865,072

(22) PCT Filed: Jan. 29, 2009

(86) PCT No.: PCT/GB2009/000246
§ 371 (c)(1),
(2), (4) Date: Jul. 28, 2010

(87) PCT Pub. No.: WO2009/095668
PCT Pub. Date: Aug. 6, 2009

(65) Prior Publication Data
US 2011/0000126 A1    Jan. 6, 2011

(30) Foreign Application Priority Data
Jan. 29, 2008 (GB) .................... 0801587.7

(51) Int. Cl.
  *C10L 1/18*   (2006.01)
  *C11C 3/00*   (2006.01)
  *C10L 1/02*   (2006.01)
  *C11C 3/06*   (2006.01)

(52) U.S. Cl.
  CPC ............. *C11C 3/003* (2013.01); *C10L 1/026* (2013.01); *C11C 3/06* (2013.01); *C10G 2300/1011* (2013.01); *Y02E 50/13* (2013.01); *Y02P 30/20* (2013.01)

(58) Field of Classification Search
  CPC ............. B23B 2226/315; B23B 2228/10; B23B 27/20; B23B 51/00; B23C 5/16; C10G 2300/1011; C10L 1/026; C11C 3/003; C11C 3/06; C23C 16/0254; C23C 16/271; C23C 16/277; Y02E 50/13
  USPC ................................ 44/308, 388
  See application file for complete search history.

(56) References Cited

U.S. PATENT DOCUMENTS 2,360,844 A    10/1944  Bradshaw et al.
2,383,632 A *   8/1945  Trent ..................... 554/167
(Continued)

FOREIGN PATENT DOCUMENTS

DE    4209779    7/1993
EP    0131991    1/1985
(Continued)

OTHER PUBLICATIONS

UK Intellectual Property Office Search Report for GB0801587.7, dated May 30, 2008.
(Continued)

*Primary Examiner* — James Goloboy
*Assistant Examiner* — Latosha Hines
(74) *Attorney, Agent, or Firm* — Finnegan, Henderson, Farabow, Garrett & Dunner, L.L.P.

(57) ABSTRACT

A method for producing diesel grade fuel of plant origin by transesterifying a refined vegetable oil with a charge of a C1-C4 alcohol in the presence of a catalyst and at least 0.2 parts by volume, related to unit volume of refined vegetable oil, of an aliphatic hydrocarbon solvent with a boiling point of −42° C. to 200° C., comprises mixing the oil, alcohol, catalyst and solvent in a single reaction vessel under homogeneous conditions which promote transesterification to 95-98% completion and which suppress reverse glycerolysis, without stopping transesterification to remove by-product polar glycerol, and without subjecting the oil/fuel mixture to a further transesterification step with a fresh charge of alcohol and catalyst.

31 Claims, 2 Drawing Sheets

(56) References Cited

U.S. PATENT DOCUMENTS

| | | | |
|---|---|---|---|
| 2,383,633 | A | 8/1945 | Trent |
| 4,695,411 | A | 9/1987 | Stern et al. |
| 5,219,733 | A | 6/1993 | Myojo et al. |
| 5,354,878 | A | 10/1994 | Connemann et al. |
| 5,424,467 | A | 6/1995 | Bam et al. |
| 5,520,708 | A | 5/1996 | Johnson et al. |
| 5,713,965 | A | 2/1998 | Foglia et al. |
| 6,015,444 | A | 1/2000 | Craft et al. |
| 6,697,986 | B2 | 2/2004 | Kim et al. |
| 2005/0033071 | A1 | 2/2005 | Tatsumi et al. |

FOREIGN PATENT DOCUMENTS

| | | | |
|---|---|---|---|
| WO | WO 03/040081 | * | 5/2003 |
| WO | WO 2007/071046 | | 6/2007 |

OTHER PUBLICATIONS

PCT International Search Report for PCT/GB2009/000246 dated Sep. 29, 2009.

Kim et al., "Transesterification of vegetable oil to biodiesel using heterogeneous base catalyst," Catalysis Today, Elsevier, vol. 93-95, pp. 315-320, Sep. 1, 2004.

Hoffmann, "The Chemistry and Technology of Edible Oils and Fats and their High Fat Products," Academic Press Limited, pp. 139-147, 1989.

"Production of a cost-competitive biodiesel fuel alternative to petroleum diesel," Environmental Science & Engineering, http://www.esemag.com/0501/diesel.html, downloaded Jun. 10, 2010.

Darnoko et al., "Continuous Production of Palm Methyl Esters," JAOCS, vol. 77, No. 12, pp. 1269-1272, 2000.

* cited by examiner

TRANSESTERIFICATION OF VEGETABLE OILS

The present invention relates to improved methods for transesterifying vegetable oils and related triglycerides and, in particular, to improved methods for producing diesel grade fuel of plant origin, nowadays often referred to as biodiesel fuel or simply biodiesel, by transesterifying vegetable oils with low molecular weight alcohols, the alcohols typically having 1 to 4 carbon atoms.

As known, transesterification with an alcohol has a decisive influence on the quality of fuels produced from vegetable oils because this operation determines whether or not the viscosity of the resulting fuel is suitable for fuel injection and engine powering purposes.

Transesterification of vegetable oils with an alcohol proceeds in a reversible equilibrium reaction according to the scheme:

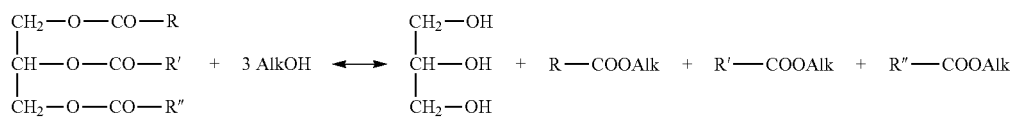

In the above formulae R, R' and R" represent the hydrocarbyl moieties of the fatty acid constituents of vegetable oils and Alk is a C1-C4 alkyl group. As shown in the above scheme, glycerol is formed as a by-product in the reaction in addition to the fatty acid methyl esters usable as fuel. The equilibrium can be shifted towards the formation of the required fatty acid alkyl esters by increasing the amount of the alcohol reactant and/or by removing the glycerol by-product. Transesterification is normally carried out in the presence of a catalyst. Usually bases are used as the catalysts (most frequently potassium hydroxide); acid catalysts are used less frequently. The alcohol most frequently used is methanol.

The classical method for transesterifying vegetable oils with methanol and for producing biodiesel fuel is disclosed in various early US patents. For example, U.S. Pat. No. 2,360,844 to Bradshaw et al. discloses a process comprising reacting a crude glyceride with an alcohol of not more than 4 carbon atoms under substantially anhydrous conditions in the presence of sufficient alkali metal base to neutralise the free acids in the glyceride and to maintain the solution alkaline to Clayton yellow. Acid is added to the mixture of alkyl esters in an amount sufficient to decompose the soaps formed. The glycerine is separated, the monoalkyl esters of the fatty acids contained in the glyceride are recovered and then they are saponified. U.S. Pat. No. 2,383,632 to Trent discloses a process for the alcoholysis of fatty glycerides comprising reacting the fatty glycerides with a low molecular weight monohydric alcohol to produce a body of liquid containing esters of fatty acids from the glyceride with the alcohol, glycerine and unreacted alcohol, volatilising the unreacted alcohol from the body of liquid, and separating the esters from the glycerine. U.S. Pat. No. 2,383,633, also to Trent, discloses a very similar process comprising reacting a fatty glyceride with a monohydric alcohol having one to about six carbon atoms per molecule in the presence of an alkaline alcoholysis catalyst to produce a body of liquid containing esters of the alcohol with fatty acids, glycerine and unreacted alcohol, volatilising the unreacted alcohol from the body of liquid, acidifying the residue of the body of liquid, and separating the esters from the glycerine.

This classical method has been generally followed till now, with some minor modifications, for the industrial scale production of biodiesel fuel. Typically, vegetable oil is reacted with methanol in the presence of potassium hydroxide catalyst for at least half an hour at a temperature below the boiling point of methanol (usually at 65° C.). As methanol and vegetable oil have only limited miscibility in each other, the biphasic reaction mixture is intensely stirred and/or phase transfer catalysts are used in order to accelerate the reaction. Glycerol, which is generated as a by-product, accumulates in the polar (methanol) phase and, in accordance with the equilibrium nature of the reaction, is prone to reconvert the once-produced fatty acid methyl esters into glyceride esters. Phase transfer catalyst, if present, also assists this reconversion process. Thus, full conversion of the vegetable oil cannot be attained. When the reaction mixture is close to equilibrium, which corresponds to a conversion of about 80 the mixture is allowed to settle for about 12-24 hours. Thereafter, the lower polar phase (which comprises glycerol together with the major portion of methanol used in excess) is removed, and the reaction is repeated with the upper apolar phase using freshly admixed alcohol and catalyst. After this second step, the upper apolar phase (fuel phase) is separated again, subjected to distillation to remove a major part of the methanol contained therein, washed with aqueous sulphuric acid to remove potassium hydroxide and to avoid emulsification, washed again with water, dried and filtered. This latter series of operations constitutes the refining of biodiesel fuel. If desired, quality-improving additives, particularly additives for improving cold resistance, are added to the resulting biodiesel fuel.

Major disadvantages of the above method are as follows: due to the biphasic mixture, the reaction requires a lengthy period of time and an energy consuming intense stirring to proceed; separation of the phase which contains glycerol by-product is difficult and extremely time consuming; methanol needs to be used in a great excess of the stoichiometric amount in order to shift the reaction towards the formation of the required product; the majority of non-reacted methanol appears in the glycerol phase from which it cannot be recovered in an economic way unless acceptable operational capacity is employed.

In a paper discussing the improvement potential of biodiesel fuel production by transesterification (D. Darnoko and M. Cheryan: JAOCS 77, 1269-1272 (December, 2000)), the authors mention as further disadvantages that the method requires large reactor volumes and repeated start up/shut down cycles resulting in increases in capital and labour investments and decrease in production efficiency. Furthermore, the quality of the product may vary from batch to batch.

According to U.S. Pat. No. 5,520,708 to Johnson et al. and U.S. Pat. No. 6,015,444 to Craft et al., the time required for transesterification and phase separation is reduced by performing the reaction in an assembly of a static mixer, a heat exchanger, a homogenizer and a settling vessel rather than using a conventional reaction vessel equipped with a stirrer. The static mixer used in this method, like all static mixers, does not contain moving elements for mixing the reactants.

Instead, a turbulent flow serves to mix the reactants intensely, created either by flow-breaking means (such as baffles, ribs, coils etc.) mounted inside the mixer or by a packing filled into the mixer. Vegetable oil, alcohol (most frequently methanol) and catalyst are passed through the static mixer, the resulting dispersed stream is heated to reaction temperature in the heat exchanger, thereafter the mixture is subjected to a high shear in the homogenizer to form an emulsion, and the emulsion is passed into the settling vessel where no further stirring is applied. The lifespan of the emulsion formed in the homogenizer enables transesterification to proceed to equilibrium conversion before the emulsion segregates in the settler. Although a significant reduction in time requirement can be attained with this method, it is a disadvantage that a homogenizer with high energy consumption needs to be used. Again, this method does not enable a conversion higher than the equilibrium value to be attained in a single step. Thus, in order to attain the 95-98% conversion required to obtain a product with appropriate viscosity, the apolar phase has to be isolated from the polar phase and reacted once again. In addition, the alcohol needs to be used in such a great excess that this method is unacceptable for industrial scale production.

According to the method disclosed in DE 42 09 779 C1, the required conversion of about 98% is attained by performing transesterification in a column divided into reaction zones and separation zones, each reaction zone being followed by a separation zone. Vegetable oil, alcohol and catalyst are fed into the first reaction zone. Then, after a prescribed period of time, the resulting mixture is fed into the first separation zone for removing glycerol by centrifuging. The resulting glycerol-free mixture is then fed into the second reaction zone, and the above reaction/separation steps are repeated in series until the required conversion is attained. An important advantage of this method is that it can also be performed as a continuous operation, because the time-consuming settling step is replaced by a much faster centrifugal separation. However, this advantage is more than offset by the extremely high installation investments and high costs of operation and maintenance, which render the method too expensive to be widely adopted. Therefore, this method is not applied in plants with a capacity lower than 100,000 tons/year. As a further disadvantage, this method cannot be applied for transesterifying vegetable oils containing more than 2% of free fatty acids.

In order to avoid the disadvantages associated with heterogeneous reactions, particularly in order to decrease reaction time and the energy demand of stirring, it has also been suggested to transesterify vegetable oils with alcohol under homogeneous reaction conditions [www.bioxcorp.com. with reference to Production of a cost-competitive biodiesel fuel alternative to petroleum diesel, in Environmental Science & Engineering, May 2001]. According to this attempt, a polar solvent having good solubility in both the polar alcohol and in the apolar vegetable oil (such as tetrahydrofuran or N-methyl-2-pyrrolidinone) has been utilized as the reaction medium. However, such a method requires very complicated and energy-consuming separation steps for processing the final reaction mixture, which undermines the advantages resulting from the use of a homogeneous mixture. Namely, due to a change in phase conditions, after transesterification the polar solvent distributes between the biodiesel phase with increased polarity and the glycerol phase with increased polarity and should be removed from both phases. The disadvantages arising from the equilibrium nature of the reaction cannot be avoided with this method, since glycerol is continuously present in a reactive state in the reaction mixture for transesterification. Thus, this solvent-assisted method has only been utilized on the industrial scale for demonstration purposes.

Publications relating to biodiesel fuel production state that efficient transesterification, which is imperative for obtaining a product with the required quality, requires the use of refined vegetable oil as starting substance. This holds particularly when the vegetable oil is a waste product, such as spent frying oil. No specific method for refining vegetable oils has been disclosed, however, in publications relating to biodiesel fuel production. According to the known technologies for producing food grade products, vegetable oils are refined by treating them with water to remove hydratable phospholipids and with acids, like phosphoric acid or citric acid, to remove non-hydratable phospholipids [Hoffman, G.: Chemistry and technology of edible oils and fats and their high fat products, Academic Press, London; Toronto, 1989]. The resulting refined vegetable oils (known in food technology as "degummed oils") are suitable starting substances for biodiesel fuel production. For transesterification proceeding in a heterogeneous phase, it is an advantage that such refined (degummed) vegetable oils contain a series of minor components with some surfactant properties. In the methods of U.S. Pat. Nos. 5,520,708 and 6,015,444 cited above, just these vegetable oil components are utilized to form an emulsion. At the same time, the difficulties arising at the separation of the apolar phase comprising transesterified substances from the polar phase comprising glycerol by-product can be attributed to the presence of these components.

U.S. Pat. No. 5,424,467 to Bam et al. describes a method for purifying alcohol esters obtained by transesterifying vegetable oils and animal fats. After reaching equilibrium for the transesterification, a separation step is carried out to separate a first phase containing the alcohol ester, unreacted alcohol and catalyst from a second phase including by-product glycerol, unreacted alcohol and catalyst. The glycerol is then separated from the unreacted alcohol and catalyst and the first phase is then treated with the isolated glycerol which removes more unreacted alcohol and catalyst from the wanted alcohol ester.

Myojo et al., in U.S. Pat. No. 5,219,733, describe a process for preparing fatty acid esters, in which a component selected from the group consisting of sterols and branched aliphatic primary or secondary alcohols having 14 to 32 carbon atoms, and a component selected from the group consisting of fatty acids and fatty acid esters are reacted with an enzyme selected from the group consisting of lipase and cholesterol esterase (or with the selected enzyme in an immobilized form), in an aqueous medium or a water-containing organic solvent to prepare a fatty acid ester of the sterol or aliphatic alcohol.

U.S. Pat. No. 6,697,986 to Haas describes a method of producing biofuels by carrying out the enzymatic transesterification of fatty acid-containing materials directly in automotive fuels.

An acid-catalysed process for producing biofuel suitable for combustion in diesel engines is described in U.S. Pat. No. 4,695,411 to Stern et al. This process comprises: a first acid transesterification step in the presence of at least one aliphatic, linear or branched monoalcohol of 1 to 5 carbon atoms, consisting at least partly of hydrated ethyl alcohol containing 1 to 60% by weight of water, said step leading to the formation of a phase mainly containing ethyl esters after removal of the produced glycerol phase; a second step wherein the initial free acidity or that formed during the first step in the phase containing the esters is decreased to a value at most equal to about 2%; and a third step of basic transesterification of the phase resulting from step B, in the presence of at least one aliphatic, linear or branched monoalcohol of 1 to 5 carbon atoms, with the recovery of the so-formed ester composition.

The process disclosed in U.S. Pat. No. 5,354,878 to Connemann et al. includes the steps of: a) introducing a mixture of oil phase, alcohol and catalyst at reaction temperature into the top of a first reactor column, at a rate of flow which is lower than the sinking rate of the glycerine separated from the reaction mixture; b) passing the reaction mixture into a second reactor for further transesterification; c) freeing the thus-obtained reaction mixture of glycerine in an initial separating stage by means of a short-term washing; d) passing the reaction mixture into a third reactor with addition of further alcohol and catalyst, and at a rate of flow conforming to the first stage of the process; e) further transesterifying the reaction mixture; f) freeing the reaction product of the remaining methanol, glycerine, soaps formed and catalyst in a second separating stage, under addition of an aqueous extraction buffer solution, and g) freeing the reaction mixture of lower alcohols by stripping, washing with suitable extraction and washing solutions, and drying.

International patent application No. WO 2007/071046 discloses a process for preparing fatty alkyl esters, (biodiesel) comprising transesterifying an oil, fat or grease with a solution comprising a lithium base and a monohydric aliphatic alcohol to produce fatty alkyl esters and lithium alkaline glycerin; separating the fatty alkyl esters from the lithium alkaline glycerin and utilizing the lithium alkaline glycerin to saponify fatty alkyl compounds to produce glycerin and lithium soaps; and optionally, separating the glycerin and lithium soaps.

In international patent application No. WO 2003/040081, Kovacs et al. disclose a method for producing diesel grade fuel of plant origin using a loop reactor in which refined vegetable oil is transesterified in a homogeneous phase in the presence of at least 0.2 parts by volume, related to unit volume of refined vegetable oil, of an aliphatic hydrocarbon solvent with a boiling point of 40-200° C. to form a mixture comprising a polar phase and an apolar phase. If necessary, i.e., when the refined vegetable oil feedstock and reagent mixture have reached equilibrium for the first time to achieve a conversion rate of about 80%, the apolar phase comprising non-transesterified vegetable oil, aliphatic hydrocarbon solvent and transesterified product, obtained after removing the separated polar phase comprising glycerol by-product, is reacted in a further step with a C1-C4 alcohol in the presence of a catalyst until a transesterification conversion of 95-98% is attained. The separated polar phase comprising glycerol by-product is removed, and the apolar phase comprising the fuel is refined. If desired, at least a portion of the aliphatic hydrocarbon solvent may be retained in the product.

The present invention represents a further improvement over the above-described process of Kovacs et al., using the aliphatic hydrocarbon carrier solvent. The improvement resides in carrying out the process in fewer steps in a single reactor vessel, whilst attaining the required conversion of 95-98% without time-consuming intermittent glycerol separation steps. The improvement enables significant savings to be made both in capital expenditure on plant equipment, and in operational expenditure through more precise use of chemical reagents reactants, lower energy requirements and reduced reaction times.

It has surprisingly been found that transesterification of refined vegetable oil in the presence of catalyst and a C1-C4 alcohol can be carried out to 95-98% completion or higher in a single conventional reactor which serves as a combined reactor/settler system by taking advantage of the solubility characteristics afforded to the reaction system by selection of an apolar carrier solvent. The reactant mixture of refined vegetable oil substrate feedstock, a charge of alcohol, catalyst and apolar solvent is mixed for a predetermined period of time in the reaction vessel under controlled shear conditions. Then, the mixture is allowed to stand for a predetermined period of time without further stirring. The mixture rapidly separates into two phases, a lower polar phase containing glycerol by-product and an upper apolar phase containing the wanted fatty acid esters. The unexpected feature of this process is that, even on standing, the reaction continues to be driven forward in favour of production of a higher proportion of fatty acid esters than normal equilibrium considerations would dictate. This is because the apolar phase retains a sufficient proportion of the alcohol and catalyst to transesterify unreacted vegetable oil substrate when stirring has been stopped, yet there is no significant reverse mixing of the glycerol phase because glycerol has a much more limited solubility in the apolar phase. Indeed, glycerol by-product continues to separate from the apolar phase as the reaction proceeds in the desired forward direction.

The apolar solvent used in this process is an aliphatic hydrocarbon (which term covers n-alkanes, alkanes, and cycloaliphatic-aliphatic hydrocarbons) having a boiling point of −42° C. to 200° C. or a mixture of such hydrocarbons, and it is used in an amount of at least 0.2 parts by volume related to unit volume of the starting refined vegetable oil. It is particularly preferred to having low aromatic content (substantially free of aromatics) to avoid acid sludge formation in the case of using sulphuric acid as a catalyst.

The lower polar phase which comprises glycerol by-product is drawn off and may be subjected to further processing, for example to recover any entrained alcohol and catalyst. The glycerol may also be used in a refining step to treat unrefined vegetable oil in a procedure that will be described in more detail below. The apolar phase which comprises the desired fuel product may be subjected to a refining procedure.

In effect, the mixture for transesterification remains homogeneous during the full course of the reaction, which enables the reaction to proceed quickly. At the same time, as the reaction proceeds, glycerol accumulates in a distinct polar phase, which fully separates from the apolar phase within a short period of time upon standing. By an appropriate feeding of the charge of alcohol, it can also be attained that only a small amount of alcohol is dissolved in the polar phase. Thus, only a small loss in alcohol is caused by the removal of the polar phase, so the amount of alcohol required in transesterification can be reduced significantly.

In another variant of single-vessel processing, transesterification is carried out in a single counter current device in which the refined vegetable oil substrate mixed with an aliphatic carrier solvent enters the reaction vessel at a lower feed point, whilst the alcohol reactant and catalyst enter the reaction vessel at a higher feed point or higher feed points. The higher specific gravity glycerol by-product forms a distinct phase and, in forming larger droplets, sinks to the bottom of the reaction vessel from where it is withdrawn. The relatively lower specific gravity fatty acid esters form the continuous phase that rises and may be withdrawn from the top of the reaction vessel.

By a "charge" of alcohol is meant an amount of alcohol effective to undergo the transesterification with the vegetable oil in the appropriate stoichiometric ratios—usually an excess of the alcohol is used. In the counter current variant of the invention, the alcohol charge is typically fed to the reaction vessel at a lower feed point and may be fed continuously. In the non-counter current variant of the method of the invention, the alcohol charge may be fed to the reaction vessel in portions, so that only a small amount of alcohol becomes dissolved in the polar phase formed largely of bi-product glycerol. Hence, it will be understood that a charge of alcohol can be a continuous feed stream of alcohol, a number of portions of alcohol, or a single portion of alcohol.

In either scheme, the transesterification may be performed at a temperature of 60-140° C., preferably at 95-115° C., under a pressure sufficient to maintain the alcohol/solvent in the liquid state. Any of the conventional catalysts usable for transesterification can be applied in the method of the invention. Potassium hydroxide is a particularly preferred basic catalyst. Sulphuric acid is a particularly preferred acid catalyst. Typically, pressure may be 1-40 bar.

The lower limit of the amount of the aliphatic hydrocarbon solvent is a critical value. It has been observed that the minimum amount of aliphatic hydrocarbon solvent required to form a homogeneous phase in transesterification varies with the nature of the starting vegetable oil and with the method used to refine the vegetable oil. When the vegetable oil has been refined according to the method described below, a proportion as low as 0.2 parts by volume of aliphatic hydrocarbon solvent may be sufficient to form a homogeneous phase in transesterification of certain vegetable oils. By contrast, when the vegetable oil has been refined by another method (e.g. by an aqueous-acidic treatment), the minimum amount of aliphatic hydrocarbon required to form a homogeneous phase in transesterification may be greater (usually 0.3-0.4 parts by volume, related to unit volume of refined plant oil). The required minimum amount of aliphatic hydrocarbon solvent can easily be determined experimentally. When the amount of the aliphatic hydrocarbon solvent is increased above the critical lower limit, the time required for full separation of the polar and apolar phase decreases. However, the upper limit of the amount of the aliphatic hydrocarbon solvent is not a decisive factor, and depends primarily on economic considerations. It has been found that no particular advantages arise from raising the amount of the aliphatic hydrocarbon solvent above twice the amount of the starting refined vegetable oil. The volume ratio of the starting refined vegetable oil to the aliphatic hydrocarbon solvent may be preferably 1:(0.2-1.5), more preferably 1:(0.3-1), particularly 1:(0.4-0.7).

As aliphatic hydrocarbon solvents, the alkanes from propane up to octanes may be used. Preferably substances with boiling points of 60-180° C. or mixtures of such substances can be used (when a mixture is used, the figures represent boiling ranges). Mineral oil cuts of low aromatic content with boiling ranges of 60-100° C., 100-140° C. and 140-180° C. are particularly preferable.

The volume ratio of the starting refined vegetable oil to the alcohol reactant may be 1:(1.05-2.0), more preferably 1:(1.1-1.5).

Non-refined vegetable oil may be converted to the refined vegetable oil preferred for use as the starting substrate in the processes of the present invention by treatment with aqueous glycerol and an aliphatic hydrocarbon solvent boiling at −42° C. to 200° C. and allowing the mixture to settle. More particularly, unit volume of non-refined vegetable oil is thoroughly admixed with at least 0.2 parts by volume (preferably 0.2-1.5, more preferably 0.3-1, particularly 0.4-0.7 parts by volume) of an aliphatic hydrocarbon solvent with a boiling point of −42° C. to 200° C., preferably 60° C. to 120° C., and with 0.07-0.2 parts by volume (preferably 0.09-0.15 parts by volume) of aqueous glycerol comprising 5-40% by volume (preferably 10-20% by volume) of water. The mixture is allowed to settle to form a lower polar phase and an upper apolar phase, and the upper apolar phase, which is a solution of the refined vegetable oil in the aliphatic hydrocarbon solvent, is then transferred to transesterification. Note that the upper apolar phase is in fact a solution of refined vegetable oil in the aliphatic hydrocarbon solvent selected for the transesterification reaction. A particular advantage of this refining technique lies in treating the oil in solution, for exactly the same reason as in transesterification, whereby the polar compounds are rejected from the oil into the glycerol phase. This represents an improvement over sulphuric acid pretreatment, back to Kalicevskij from the 1930s.

Using this refining method, impurities and components which disturb transesterification and subsequent separation can be removed from the vegetable oil much more efficiently than by conventional methods. A particular advantage of the vegetable oil refining method described above is that minor components with surfactant properties, which cannot be removed from vegetable oil using conventional aqueous-acidic refining, are also removed. This further accelerates the separation of the polar and apolar phases formed in transesterification.

Alternatively, pretreatment of non-refined or partially refined vegetable oils may be carried out by feeding the vegetable oil and an aliphatic hydrocarbon solvent having a boiling point of −40° C. to 200° C. into at least a lower zone of a counter current packed column apparatus, feeding an alcohol (preferably a $C_1$-$C_4$ alcohol) and, optionally, a catalyst into at least one higher zone of the column and allowing the feed streams to interact. The refined oil product is removed from a top zone of the column. The purpose of the pretreatment is to lower the free fatty acid and phosphatide content of the vegetable oil feedstock.

For example, if the alcohol stream is a glycerol stream (such as a mixture of glycerol and water in the proportion range 2:1 to 1:2, preferably 1.5:1 to 1:1.5), some of the phosphatide are removed because they are polar; the free fatty acids are separated by reacting with the excess alkalinity of the glycerol stream into potassium soap that will be dissolved in the polar phase. Hence, the raffinates will be low in free fatty acids and low in phosphatides.

Alternatively, the column packing may include a stationary phase catalyst. For example, if the column packing includes ion exchange resin, such as Amberlist 15, and the alcohol is methanol, the free fatty acids are converted to fatty acid methyl esters and, due to the presence of the apolar aliphatic solvent, water formed in the esterification process is displaced from the reaction medium into the polar phase and hence cannot participate in reverse hydrolysis of the esters. In this case, the phosphatide removal is not significant.

In yet another variant, if the pretreatment is carried out with methanol and sulphuric acid, a double effect is observed: free fatty acids are converted into fatty acid methyl esters and some of the phosphatides are hydrated. Both hydrated and non-hydratable phosphatides are removed by virtue of the polar sulphuric acid, which draws them in to the polar phase and away from the non-polar phase which contains the thus-refined vegetable oil and the aliphatic hydrocarbon solvent.

A further important advantage of the above described refining methods is that no foreign substance is introduced into the process, since the aliphatic hydrocarbon solvent is the same as that utilized as reaction medium in transesterification, and the glycerol is the by-product formed in transesterification.

A further advantage of the present method is that conventional vegetable oil extraction technologies employ hexane, which need not be separated in energy intensive distillation, but can be transferred instead as a co-solvent with the vegetable oil to the refining and transesterification stages. Solvent recycling may then be postponed until after transesterification, so that further economies are possible.

Particularly preferred methods will now be described by way of example only with reference to the drawings, in which.

Figure 1:
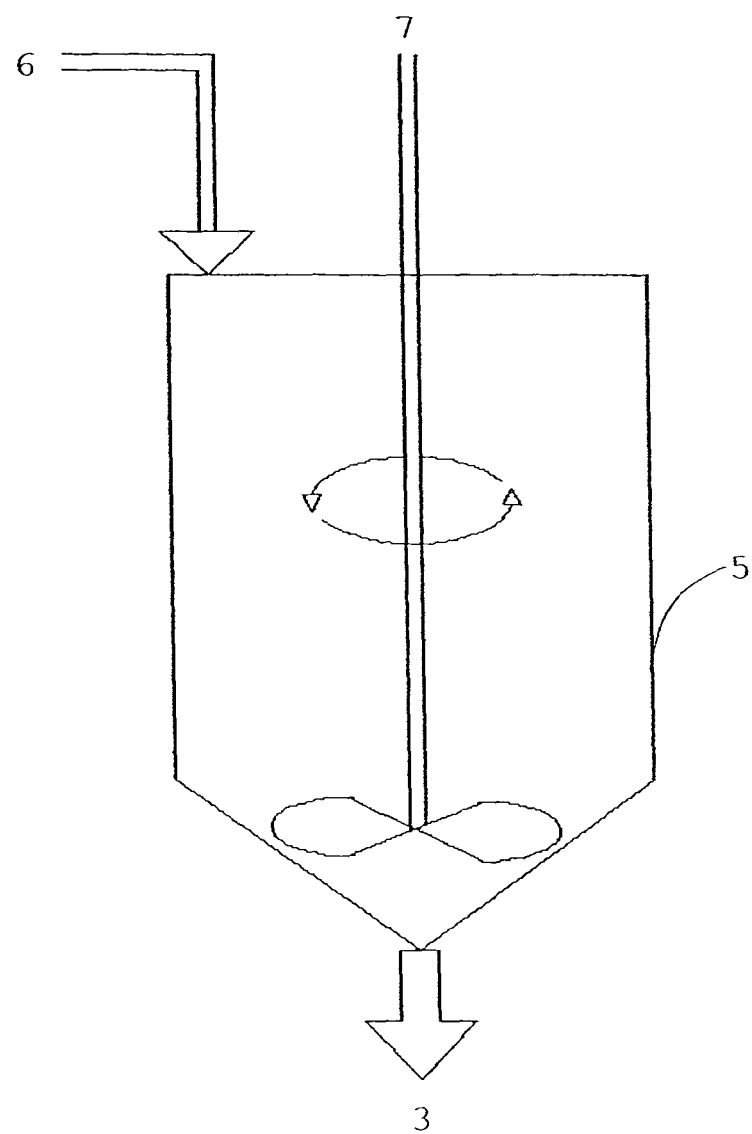
FIG. 1 is a schematic view of a simple stirred reaction vessel for carrying out the method according to an embodiment of the invention.

In a first preferred embodiment, transesterification is carried out in a reaction vessel 5 equipped with stirrer means 7 according to the following scheme: The aliphatic hydrocarbon solvent, the refined vegetable oil (or a preformed solution thereof, e.g. the upper apolar phase obtained from a refining step such as that described above), the alcohol and the catalyst (or a preformed solution thereof) are introduced into the reactor vessel at a point shown by arrow 6, and the mixture is stirred at the prescribed reaction temperature. When the reaction is performed under atmospheric pressure, the temperature of the reaction must not exceed the boiling point of the alcohol. However, the reaction can also be performed at higher temperatures under superatmospheric pressure, provided that the alcohol remains in the liquid state. The reaction can be performed at a temperature of 60-140° C. under a pressure of 1-40 bar. Applying elevated temperature under superatmospheric pressure, the speed of reaction can be further increased. When transesterification reaction has reached the steady (equilibrium) state, heating and stirring is stopped, pressure is reduced to atmospheric if necessary, and the phases are allowed to separate. It has been observed that the steady state sets in within a short time (sometimes even within 10 minutes), and the separation of the phases is also quick (full separation sometimes also occurs within 10 minutes). The reactor contents are allowed to stand without stirring for a further predetermined period of time, during which the reaction in the upper apolar phase continues to proceed in the forward direction to produce more fatty acid ester and glycerol by-product which rapidly settles into the lower polar phase. Consequently, the glycerol is unavailable for the reverse reaction. This helps to drive the reaction in the desired forward direction. After the predetermined period of repose, i.e., non-stirring, the desired 95-98% conversion is attained.

The lower polar phase, consisting mainly of glycerol together with a small amount of alcohol is removed as indicated by arrow 3, and may be subjected to known glycerol processing operations, if desired.

The alcohol and catalyst may be introduced into the reactor vessel in portions so that, in the initial stage of transesterification, the mixture in the reactor vessel contains the alcohol only in a stoichiometric amount or less, and the amount of added alcohol is raised above the stoichiometric value only when a relatively high conversion (preferably above 80%) has already been attained.

It should be noted that the continuance of the reaction in the forward direction in the absence of stirring is most surprising, since it was previously believed that the transesterification reaction would not proceed after phase separation, or if it did, only very slowly.

However, it is now recognized that the reaction continues at an appreciable rate even after phase separation. Indeed, the total time for mixing and settling periods in the present invention is shorter than the first stage mixing step of standard industrial practice. As a result of the continuous separation of glycerol from the apolar phase at standing, the transesterification reaction is shifted towards the formation of the required fatty acid alkyl esters, and the required 95-98% conversion can be attained without stopping transesterification, separating the phases, and repeating transesterification in a further step on the apolar upper phase. No significant alcohol excess is required to attain 95-98% conversion, either. A further important advantage of this method is that it can be performed in a very simple apparatus.

If desired, a portion of the glycerol can be recycled in a vegetable oil refining step after admixing it with the required amount of water. Moreover, if a vegetable oil refined according to the method described above is used in the transesterification, the purity of the resulting glycerol phase is higher than that attainable by conventional methods. Thus its further processing is easier. This is an additional advantage of the method of the invention.

The upper apolar phase obtained at the end of transesterification, which comprises the required biodiesel fuel, is then subjected to refining operations. Conventional steps of refining can be applied. The aliphatic hydrocarbon solvent can also be removed upon refining. However, in some instances, particularly when aliphatic mineral oil cuts with higher boiling ranges have been applied, it is preferred to retain at least a portion of the aliphatic hydrocarbon solvent in the biodiesel fuel product, because these components improve the quality of the fuel (e.g. increase its cetane number and decrease its iodine number).

Figure 2:
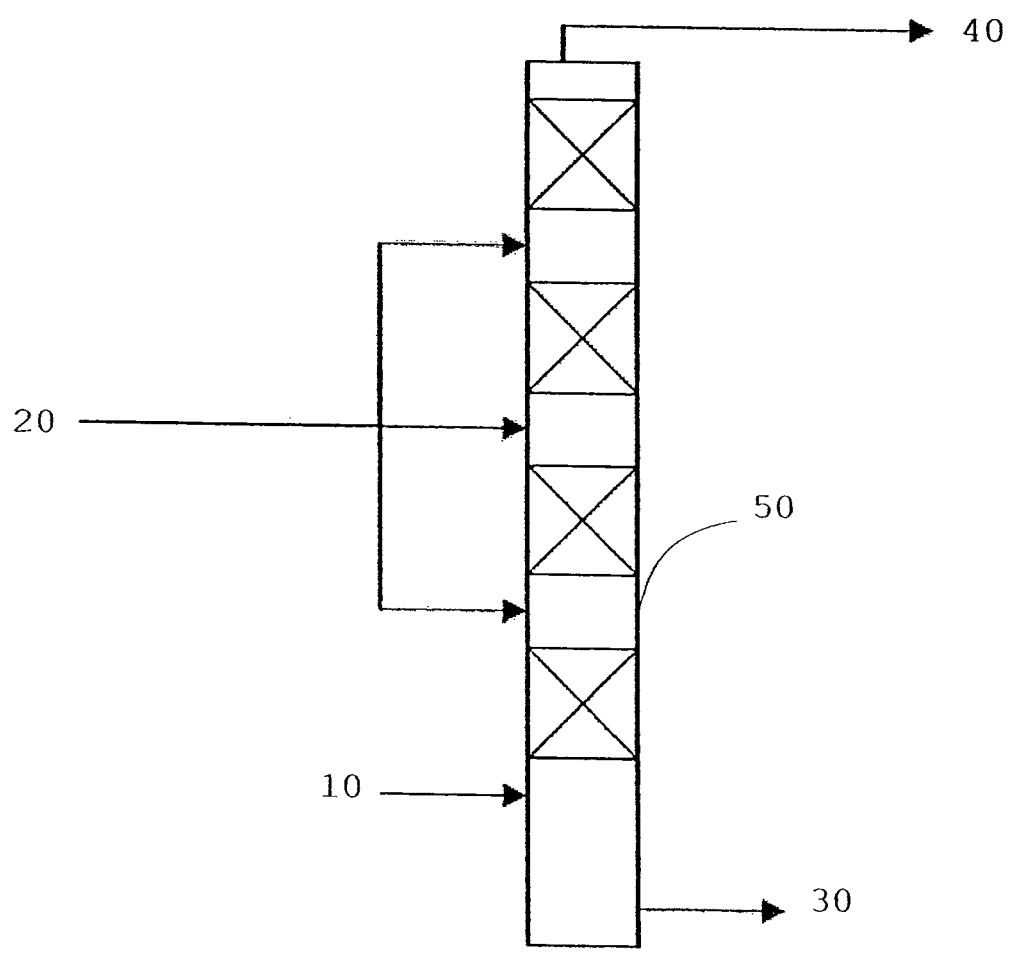
FIG. 2 is a process flow diagram showing a packed column arrangement for carrying out the method according to an alternative embodiment of the invention.

In a second preferred embodiment, truly continuous operation is achieved using counter current operation in a packed column 50 as illustrated in FIG. 2. The packing may be, for example, glass or ceramic Raschig rings—ferrous packing would be wetted by the oil but not by other constituents of the reaction mixture, whilst inox packing would not be wetted by any of the constituents present.

The vegetable oil to be converted and hexane as the carrier solvent are pre-mixed and fed to the bottom of the column as indicated by arrow 10. The reactant alcohol in this example is methanol, in which is dissolved potassium hydroxide catalyst. The methanolic catalyst solution is introduced into the column at three higher points represented by the arrow 20. The oil/hexane phase being light rises through the column, taking some methanol with it. The reversible transesterification reaction is shifted toward the desired forward direction by instantaneous removal of glycerol as it is freed from the triglyceride structure. This condition is met by efficient phase separation of the oil and glycerol phases due to the low solubility of glycerol in hexane. As there is no significant back-mixing of the glycerol phase, the reverse reaction of FAME glycerolysis into triglyceride and methanol is negligible within the oil/hexane phase.

These conditions are realized in the counter current contact scheme described here, in which the oil phase forms the continuous phase and the glycerol the dispersed phase. Refined feedstock enters the reactor and rises against the falling glycerol droplets. Methanol (reagent) and the catalyst are added along the ascending flow of the feedstock (substrate). The major part of the reagent dissolves in the oil phase, and a minor part in the disperse globules. In the oil phase, the forward reaction takes place; the glycerol by-product of the reaction is immiscible in the vegetable oil, biodiesel and hexane mixture and thus is displaced, forming globules descending along the column.

The crude biodiesel leaves the column head as a continuous raffinate stream as indicated by the arrow 40. Glycerol may be extracted from the foot of the column, as indicated by the arrow 30.

The counter current scheme described here effectively combines reaction vessel and separation unit in one piece of equipment.

The truly continuous operation drastically reduces the volume of chemicals in the process inventory. Handling smaller volumes also contributes to a reduction in the hazard and risk of pollution, and makes it easier to satisfy health and safety requirements.

The residence time in the column is very short compared to a batch reaction system, being of the order of half an hour.

The use of packed columns may also be adopted in other parts of the overall process for biodiesel production, in addition to the transesterification step. For example, excess methanol in the reaction phase travels with the hexane/biodiesel phase out at the top of the transesterification column and needs to be removed from the biodiesel. This may be performed in a packed column where the diesel phase is contacted firstly with acid to neutralise the catalyst and then with water to extract the methanol from the biodiesel. A packed column may also be used for the previously-described feedstock preparation or refining step, in which the oil/hexane feed is contacted with glycerol from the transesterification column and the sour water to remove the free fatty acids and soaps from the source vegetable oil.

Hexane may be removed from the biodiesel in a distillation column, where it is boiled off together with any water to leave clean biodiesel.

Depending on the particular aliphatic carriers solve a selected, for example if the aliphatic carrier solvent has suitable properties such as a flashpoint above 100° C., some of it may be allowed to remain in the biodiesel because it may improve the quality of the fuel, for example by increasing its cetane number and decreasing its iodine number.

A preferred method of refining the raffinate taken from the top of the transesterification column is described below.

The biodiesel phase is washed with dilute aqueous sulphuric acid and then with water. Water introduced with these operations is removed by azeotropic extractive distillation. Finally, if desired, the aliphatic hydrocarbon solvent or a part thereof is distilled off. The presence of the aliphatic hydrocarbon solvent considerably simplifies the removal of water during refining. Methanol is recycled from the glycerol/water phase by distillation.

For refining the lower glycerol phase, any entrained alcohol is removed by distillation for recycling and the catalyst is removed using a method befitting the nature of the particular catalyst. For example, potassium hydroxide catalyst can be removed as potassium sulphate by sulphuric acid treatment. When neat glycerol is to be prepared, the polar phase is passed through anion and cation exchange resins. If water has been introduced during refining, this can be removed most efficiently by azeotropic distillation performed in the presence of the aliphatic hydrocarbon solvent and subsequent removal of the solvent residues by distillation.

As described above, the presence of aliphatic hydrocarbon solvent facilitates refining, too, since in its presence both glycerol and the fuel phase can be dried (dehydrated) by simple atmospheric distillation. The alcohol and the aliphatic hydrocarbon solvent can be recovered easily in the refining operation and can be recycled into the transesterification step. Portions of the separated glycerol phase can be recycled into the vegetable oil refining step described previously.

The most important advantages of the method according to the invention are as follows:
- transesterification reaction and phase separation proceed quickly;
- the amount of alcohol required for transesterification can be reduced considerably;
- simple apparatuses are required;
- the required 95-98% conversion can also be attained without an intermittent stopping of transesterification, separating the phases, and performing a repeated transesterification;
- refining of the end product is more simple;
- the solvent and the non-reacted reactants can be recovered easily and can be recycled;
- a biodiesel fuel with an even quality can be produced;
- using appropriately selected aliphatic hydrocarbon solvents, quality improving additives can simultaneously be introduced into the biodiesel fuel product.

Further details of the invention are demonstrated by the non-limiting Examples below.

As starting material, a feedstock of partially refined vegetable oil is used. The term "partially refined" means that the vegetable oil has been subjected to a series of settling and filtration steps, but that no physical or chemical degumming and neutralisation has been applied. Hence, the starting material has a higher free fatty acid and phosphatide content then fully refined vegetable oil. The first step in the example processes set out below is a pretreatment step to lower the free fatty acid and phosphatide content. As the hydrocarbon solvent, n-hexane has been used for convenience because this is the solvent typically used in extraction of oil from the raw vegetable material. In practice, non-aromatic hydrocarbons such as propane, butanes, pentanes, hexanes, heptanes, octanes, petroleum ethers and/or hydrogenated raffinates can be used.

EXAMPLE 1

(Pretreatment:) 250 g of partially refined sunflower oil were mixed with 75 g of n-hexane and placed in a Parr type reactor. 2.5 g of commercially available Amberlist 15 ion exchange resin and 10 g of methanol were added to the system. The reactor was pressurized to 15 bar by the use of nitrogen. The entire system was brought to 80° C. under continuous stirring for 30 minutes. Upon completion, the reactor was immediately cooled to room temperature under a stream of tap water and depressurized.

The above described process was repeated to obtain a sample for analysis after washing and evaporation.

(Transesterification:) The reactor content was transferred to a four neck flask of 1 liter capacity onto which a reflux cooler, a metering dropping funnel, a thermometer and an overhead mixer were attached through the joints of the flask. A few pieces of boiling stones and 20 g of methanol (with 15% KOH content) were added to the system. The entire content was brought to boiling condition (t=59° C.) and kept under continuous stirring at this temperature for minutes and then stirring was stopped and the reaction mixture was left to stand for an additional 10 minutes.

(Refining:) Upon allowing the system to cool down to 40° C., the reaction mixture was transferred into a separatory funnel, in which almost instantaneously two distinct phases formed. After leaving to stand still for 10 minutes, the lower phase was discarded (here, discarding means the removal of a stream from the system and optionally collecting it for other uses). The upper phase was washed with 40 g of 10% sulphuric acid, followed by 40 g of distilled water, with separation of the water phase in between the two operations. The lower phases were discarded. The upper phase was subjected to distillation to remove the hexane solvent. There was no sign of water in the Dean Stark distillation apparatus. A Karl Fisher check confirmed that the water content of the distilled biodiesel was 35 ppm.

Transesterification Performance:

|  | Feedstock | Pretreated | Transesterified |
|---|---|---|---|
| Viscosity at 40° C., mm$^2$/s | 34.3 | 30.4 | 4.34 |
| Acid number, mgKOH/g | 1.8 | <0.1 | <0.1 |
| Conversion, % | n.a. | 4.2 | 98.2 |
| Iodine number | 124 |  | 123 |

EXAMPLE 2

(Pretreatment:) 250 g of partially refined sunflower oil was mixed with 75 g of n-hexane and placed in a Parr type reactor. 2.5 g of commercially available Amberlist 15 ion exchange resin and 10 g of methanol were added to the system. The reactor was pressurized to 15 bar by the use of nitrogen. The entire system was brought to 80° C. under continuous stirring for 30 minutes. Upon completion, the reactor was immediately cooled to room temperature under a stream of tap water and depressurized.

(Transesterification:) The reaction content was transferred to a four neck flask of 1 liter capacity onto which a reflux cooler, a metering dropping funnel, a thermometer and an overhead mixer were attached through the joints of the flask. A few pieces of boiling stones and 20 g of methanol (with 15% KOH content) were added to the system. The entire content was brought to boiling condition (t=59° C.) and kept under continuous stirring at this temperature for 10 minutes. Then stirring was stopped and the system was left to stand for an additional 10 minutes.

(Refining:) Upon allowing the system to cool down to 40° C., the reaction mixture was transferred into a separatory funnel, in which almost instantaneously two distinct phases formed. After leaving to stand for 10 minutes, the lower phase was discarded. The upper phase was washed with 40 g of 10% sulphuric acid, followed by 40 g of distilled water, with separation of the water phase in between the two operations. The lower phases were discarded.

(Hydro-Isomerisation:) The upper phase was brought into a Parr type reactor and 0.7 g of Engelhard Ni 5256 catalyst was added. The reactor was pressurized to 15 bar by the use of hydrogen. The entire system was brought to 100° C. under continuous stirring for 20 minutes. Upon completion, the reactor was immediately cooled to room temperature under a tap water stream and depressurized.

Solvent removal: in Dean Stark distillation apparatus.
Transesterification Performance:

|  | Feedstock | Pretreated | Transesterified | Hydrogenated |
|---|---|---|---|---|
| Viscosity at 40° C., mm$^2$/s | 34.3 | 30.4 | 4.34 | 4.11 |
| Acid number, mgKOH/g | 1.8 | <0.1 | <0.1 | <0.1 |
| Conversion, % | n.a. | 4.2 | 98.6 | 98.5 |
| Iodine number | 124 |  | 122 | 113 |

EXAMPLE 3

(Pretreatment:) Partially refined sunflower oil was mixed with n-hexane in a ratio of 4:1 [g:g] and brought into contact with a solvent that was composed of 10% aqueous KOH solution and N-methyl-2-pyrollidone (BASF) in a ratio of 1:10 [g:g] in a counter current extractor. The extraction was carried out at room temperature.

(Transesterification:) 400 g of the raffinate of the pretreatment was transferred into a four neck flask of 1 liter capacity onto which a reflux cooler, a metering dropping funnel, a thermometer and an overhead mixer were attached through the joints of the flask. A few pieces of boiling stones and 35 g of methanol (with 15% KOH content) were added to the system. The entire content was brought to boiling condition (t=59° C.) and kept under continuous stirring at this temperature for 10 minutes, then left to stand for an additional 10 minutes without stirring.

(Refining:) Upon allowing the system to cool down to 40° C., the reaction mixture was transferred into a separatory funnel, in which almost instantaneously two distinct phases formed. After leaving to stand still for 10 minutes, the lower phase was discarded. The upper phase was washed with 40 g of 10% sulphuric acid, followed by 40 g of distilled water, with separation of the water phase in between the two operations. The lower phases were discarded.

(Hydro-Isomerisation:) The upper phase was subjected hydro-isomerisation, by transferring it into a Parr type reactor with the addition of 0.7 g of Engelhard Ni 5256 catalyst. The reactor was pressurized to 15 bar with hydrogen. The entire system was heated under continuous stirring and kept at 100° C. for 20 minutes. Upon completion, the reactor was immediately cooled to room temperature under a stream of tap water and depressurized.

Solvent removal: in Dean Stark type distillation. There was no sign of water in the Dean Stark distillation apparatus.

Transesterification Performance:

|  | Feedstock | Raffinate | Transesterified | Hydrogenated |
|---|---|---|---|---|
| Viscosity at 40° C., mm$^2$/s | 34.3 | 28.6 | 4.46 | 4.23 |
| Acid number, mgKOH/g | 1.8 | <0.1 | <0.1 | <0.1 |
| Conversion, % | n.a. | (yield) 92 | 99.1* | 98.7* |
| Iodine number | 124 | 126 | 123 | 115 |

* based on raffinate input

EXAMPLE 4

(Pretreatment:) 250 g of partially refined sunflower oil was mixed with 75 g of n-hexane and 50 g of glycerol solution (glycerol:water=1:1) using glycerol taken from a commercial biodiesel factory with a pH of 12.9 in a thermostated glass mixer settler at 35° C. Stirring was applied for 30 minutes and the system was then allowed to stand for 15 minutes without stirring before separating the upper raffinate and the lower extract phase. The procedure was repeated for producing a sample for analysis. The refining agent glycerol contained 1.7% potassium soap, 0.8% fatty acid methyl ester and 0.3% glycerides. The fatty acid methyl ester and the glycerides were completely extracted into the raffinate stream.

(Transesterification:) The raffinate was transferred to a four neck flask of 1 liter capacity onto which a reflux cooler, a metering dropping funnel, a thermometer and an overhead mixer were attached through the joints of the flask. A few pieces of boiling stones and 35 g of methanol (with 15% KOH content) were added to the system. The entire content was brought to boiling condition (t=59° C.) and kept under continuous stirring at this temperature for 10 minutes, then allowed to stand for an additional 15 minutes with no stirring.

(Refining:) Upon allowing the system to cool down to 40° C., the reaction mixture was transferred into a separatory funnel, in which almost instantaneously two distinct phases formed. After leaving to stand still for 10 minutes, the lower phase was discarded. The upper phase was washed with 40 g of 10% sulphuric acid, followed by 40 g of distilled water, with separation of the water phase in between the two operations. The lower phases were discarded.

(Hydro-Isomerisation:) The upper phase was transferred into a Parr type reactor and 0.7 g of Engelhard Ni 5256 catalyst was added. The reactor was pressurized to 15 bar by the use of hydrogen. The entire system was brought to 100° C. under continuous stirring for 20 minutes. Upon completion, the reactor was immediately cooled to room temperature under a stream of tap water and depressurized.

Solvent removal: in Dean Stark distillation apparatus.
Transesterification Performance:

| | Feedstock | Raffinate | Transesterified | Hydrogenated |
|---|---|---|---|---|
| Viscosity at 40° C., mm$^2$/s | 34.3 | 30.3 | 4.37 | 4.22 |
| Acid number, mgKOH/g | 1.8 | <0.1 | <0.1 | <0.1 |
| Conversion, % | n.a. | (yield) 98.5 | 98.7* | 98.3* |
| Iodine number | 124 | 128 | 122 | 113 |

* based on raffinate input

EXAMPLE 5

(Pretreatment:) 5000 g of partially refined sunflower oil were mixed with n-hexane (1550 g) in a ratio of 4:1 [g:g] and transferred into the feed tank of a 2 m high glass counter current extractor packed with Raschig rings. The solvent used was similar to example 4. The solvent to feed (S:F) ratio was S:F=1:8.5. The extraction was carried out at room temperature (19° C.). The interphase was controlled at the bottom of the column by conductivity signal and solenoid valve. The raffinate stream was collected at the top of the column, the extract phase at the bottom. Ester constituents (fatty acid methyl ester and glycerides) were completely transferred into the raffinate stream.

(Transesterification:) The same apparatus was used for transesterification as for pretreatment with the exception of circulating heating media in the jackets of the extraction column elements. The raffinate was preheated to 55° C. in a glass heat exchanger (condenser) with hot water. The raffinate stream was administered to the column at the bottom; the reagent/catalyst mixture consisted of 10% KOH in methanol and was added at the top and in the middle of the 2 m column. The substrate:reagent ratio was chosen to have 15% excess to stoichiometry.

(Refining:) The same counter current extractor was used with double refining solvent: 10% sulphuric acid was metered at the middle in a ratio of S:F=15:1, followed by metering distilled water at the head of the column at similar rate. The upper raffinate stream consisted of the converted, refined methyl ester, while the lower phase was discarded.

(Solvent removal): The raffinate solvent was freed of hexane in a Dean Stark distillation apparatus.

Transesterification Performance:

| | Feedstock | Raffinate | Transesterified |
|---|---|---|---|
| Viscosity at 40° C., mm$^2$/s | 34.3 | 31.5 | 6.42 |
| Acid number, mgKOH/g | 1.8 | <0.1 | <0.1 |
| Conversion, % | n.a. | (yield) 97.6* | 81* |
| Iodine number | 124 | 128 | 125 |

* based on raffinate input

EXAMPLE 6

(Pretreatment:) 5000 g of partially refined sunflower oil were mixed with n-hexane (1550 g) in a ratio of 4:1 [g:g] and transferred into the feed tank of a 2 m high glass counter current extractor packed with Raschig rings. The solvent used was similar to example 4. The solvent to feed ratio was S:F=1:8.5. The extraction was carried out at room temperature (19° C.). The interphase was controlled at the bottom of the column by conductivity signal and solenoid valve. Raffinate stream was collected at the top of the column, the extract phase at the bottom.

(Transesterification:) The transesterification was carried out similarly to example 5, except that the height of the counter current apparatus was increased to 3.2 m. This example illustrates that a certain contact time is needed to attain the target conversion. By increasing the height of the column, the contact time is effectively increased and, as can be seen with reference to the table of transesterification performance below, the target conversion of 99.3% is reached, whereas the shorter column (2 m) used in Example 5 is unable to achieve this.

(Refining:) The 2 m high counter current extractor was used for refining solvent similarly to example 5.

(Hydro-Isomerisation:) 300 g of the refined stream was transferred into a Parr type reactor and 0.8 g of Engelhard Ni 5256 catalyst was added. The reactor was pressurized to 10 bar by the use of hydrogen. The entire system was brought to 120° C. under continuous stirring for 10 minutes. Upon completion, the reactor was immediately cooled to room temperature under a stream of tap water and depressurized.

(Solvent removal): The raffinate solvent was freed of hexane in a Dean Stark distillation apparatus.

Transesterification Performance:

| | Feedstock | Raffinate | Transesterified | Hydrogenated |
|---|---|---|---|---|
| Viscosity at 40° C., mm$^2$/s | 34.3 | 30.3 | 4.37 | 4.22 |
| Acid number, mgKOH/g | 1.8 | <0.1 | <0.1 | <0.1 |
| Conversion, % | n.a. | (yield) 98.5 | 99.3* | 99.2* |
| Iodine number | 124 | 125 | 124 | 111 |

* based on raffinate input

EXAMPLE 7

(Pretreatment:) 5000 g of partially refined sunflower oil were mixed with n-hexane (1550 g) in a ratio of 4:1 [g:g] and transferred into the feed tank of a 2 m high glass counter current extractor packed with Raschig rings. The solvent used was similar to example 4. The solvent to feed ratio was S:F=1:8.5. The extraction was carried out at room temperature (19° C.). The interphase was controlled at the bottom of the column by conductivity signal and solenoid valve. The raffinate stream was collected at the top of the column; the extract phase at the bottom.

(Transesterification:) The same apparatus was used for transesterification as for pretreatment with the exception of circulating heating media in the jackets of the extraction column elements. The raffinate was preheated to 55° C. in a glass heat exchanger (condenser) with hot water. The raffinate stream was administered to the column at the bottom; the reagent/catalyst mixture consisted of 10% KOH in methanol and was added at the top and in the middle of the 2 m column. The substrate:reagent ratio was chosen to have 100% excess to stoichiometry.

(Refining:) The same counter current extractor was used with double refining solvent: 10% sulphuric acid was metered at the middle in a ratio of S:F=15:1, followed by metering distilled water at the head of the column at a similar rate. The upper raffinate stream consisted of the converted, refined methyl ester, while the lower phase was discarded.

(Solvent removal): The raffinate solvent was freed of hexane in a Dean Stark distillation apparatus.

Transesterification Performance:

|  | Feedstock | Raffinate | Transesterified |
|---|---|---|---|
| Viscosity at 40° C., mm²/s | 34.3 | 31.5 | 4.52 |
| Acid number, mgKOH/g | 1.8 | <0.1 | <0.1 |
| Conversion, % | n.a. | (yield) 97.6* | 95* |
| Iodine number | 124 | 128 | 125 |

* based on raffinate input

EXAMPLE 8

(Pretreatment:) 5000 g of partially refined sunflower oil were mixed with n-hexane (1550 g) in a ratio of 4:1 [g:g] and transferred into the feed tank of the 2 m high glass counter current extractor packed with Raschig rings and Amberlist 15 ion exchange resin. Methanol was metered into the column at the top, while the raffinate-hexane mixture was added at the bottom. The column was thermostated to 60° C. The solvent (reagent) to feed (substrate) ratio was maintained at 1:8 [g:g]. The interphase was controlled at the bottom of the column by conductivity signal and solenoid valve. Raffinate stream was collected at the top of the column; the extract phase at the bottom.

(Transesterification:) The counter current apparatus was 3.2 m in height. The transesterification was carried out similarly to example 5.

(Refining:) A 2 m high counter current extractor was used for refining solvent similarly to example 5

(Hydro-Isomerisation:) 250 g of the refined stream was transferred into a Parr type reactor and 0.5 g of Engelhard Ni 5256 catalyst was added. The reactor was pressurized to 15 bar by the use of hydrogen. The entire system was brought to 120° C. under continuous stirring for 15 minutes. Upon completion, the reactor was immediately cooled to room temperature under a stream of tap water and depressurized.

(Solvent removal): The raffinate solvent was freed of hexane in a Dean Stark distillation apparatus.

Transesterification Performance:

|  | Feedstock | Raffinate | Transesterified | Hydrogenated |
|---|---|---|---|---|
| Viscosity at 40° C., mm²/s | 34.3 | 27.8 | 4.37 | 4.22 |
| Acid number, mgKOH/g | 1.8 | 0.2 | <0.1 | <0.1 |
| Conversion, % | n.a. | (yield) 99.3 | 98.2 | 97.6 |
| Iodine number | 124 | 117 | 119 | 116 |

EXAMPLE 9

(Pretreatment:) 250 g of partially refined sunflower oil was mixed with 75 g of n-hexane and placed in a Parr type reactor. 2.5 g of commercially available Amberlist 15 ion exchange resin and 10 g of methanol were added to the system. The reactor was pressurized to 15 bar by the use of nitrogen. The entire system was brought to 80° C. under continuous stirring for 30 minutes. Upon completion, the reactor was immediately cooled to room temperature under a stream of tap water and depressurized, then transferred to separatory funnel. The procedure was duplicated for producing a sample for analysis.

(Transesterification:) The upper phase of the separated mixture was transferred back into the Parr type reactor. Large pore size zeolite was prepared to confer anionic exchange character and 3 g of the dried anion exchange resin was added to the reactor, together with 25 g of methanol. The system was pressurized with hydrogen to 15 bar and the temperature raised to 110° C. The stirring was maintained for 30 minutes; the system was then allowed to stand at this temperature for an additional 30 minutes without stirring. The system was cooled down and depressurized.

(Refining:) The 30° C. the reaction mixture was transferred through a paper filter into a separatory funnel, in which almost instantaneously two distinct phases formed. After leaving to stand still for 30 minutes, the lower phase was discarded. The upper phase was washed with 50 g of 10% sulphuric acid, followed by 50 g of distilled water, with separation of the water phase in between the two operations. The lower phases were discarded. The upper phase was subjected to distillation to remove the solvent hexane.

Transesterification Performance:

|  | Feedstock | Raffinate | Transesterified |
|---|---|---|---|
| Viscosity at 40° C., mm²/s | 34.3 | 29.4 | 4.42 |
| Acid number, mgKOH/g | 1.8 | 0.11 | <0.1 |
| Conversion,% | n.a. | 3.7 | 98.8 |
| Iodine number | 124 | 125 | 118 |

EXAMPLE 10

(Pretreatment:) 5000 g of partially refined sunflower oil were mixed with 1550 g n-hexane in a ratio of 4:1 [g:g] and transferred into the feed tank of a 2 m high glass counter current extractor packed with Raschig rings and Amberlist 15 ion exchange resin. Methanol with 5% sulphuric acid content was metered into the column at the top, while the raffinate-hexane mixture was added at the bottom. The column was thermostated to 60° C. The solvent (reagent) to feed (substrate) ratio was maintained at 1:8 [g:g]. The interphase was controlled at the bottom of the column by conductivity signal and solenoid valve. Raffinate stream was collected at the top of the column; the extract phase at the bottom.

(Transesterification:) The counter current apparatus was 3.2 m in height. The transesterification was carried out similarly to example 5.

(Refining:) A 2 m high counter current extractor was used for refining solvent similarly to example 5.

(Solvent removal): The raffinate solvent was freed of hexane in a Dean Stark distillation apparatus.

Transesterification Performance:

|  | Feedstock | Raffinate | Transesterified |
|---|---|---|---|
| Viscosity at 40° C., mm$^2$/s | 34.3 | 14.3 | 4.22 |
| Acid number, mgKOH/g | 1.8 | 0 <0.1 | <0.1 |
| Conversion, % | n.a. | 42 | 98.2 |
| Iodine number | 124 | 123 | 119 |

The invention claimed is:
1. A biodiesel fuel production method comprising:
   (a) charging a single vessel with a charge of:
       a refined vegetable oil;
       a C1-C4 alcohol;
       a catalyst, and
       at least 0.2 parts by volume, related to unit volume of refined vegetable oil, of an aliphatic hydrocarbon solvent with a boiling point of −42° C. to 200° C.;
   (b) mixing the oil, alcohol, catalyst and solvent in said single vessel under homogeneous conditions without stopping transesterification to remove by-product polar glycerol;
   (c) stopping the mixing and leaving the mixture to stand for a predetermined period of time in said single vessel;
   (d) allowing the mixture to separate into an upper apolar phase and lower polar phase whilst standing in said single vessel, and
   (e) allowing the upper apolar phase in said single vessel to undergo continued transesterification, without subjecting the upper apolar phase with additional alcohol and catalyst, the by-product polar glycerol of said continued transesterification passing into the lower polar phase in said single vessel.

2. A method as claimed in claim 1, wherein 0.3-1 parts by volume of aliphatic hydrocarbon solvent is used per unit volume of refined vegetable oil.

3. A method as claimed in claim 2, wherein 0.4-0.7 parts by volume of aliphatic hydrocarbon solvent is used per unit volume of refined vegetable oil.

4. A method as claimed in claim 1, wherein 1.05 to 2.0 parts by volume of reactant alcohol are used per unit volume of refined vegetable oil.

5. A method as claimed in claim 4, wherein 1.1 to 1.5 parts by volume of reactant alcohol are used per unit volume of refined vegetable oil.

6. A method as claimed in claim 1, wherein the aliphatic hydrocarbon solvent is a substance with a boiling point of 60-180° C. or a mixture of such substances.

7. A method as claimed in claim 1, wherein the aliphatic hydrocarbon solvent is a mineral oil cut of low aromatic content with a boiling range of 60-100° C.

8. A method as claimed in claim 1, wherein the aliphatic hydrocarbon solvent is a mineral oil cut of low aromatic content with a boiling range of 100-140° C.

9. A method as claimed in claim 1, wherein the aliphatic hydrocarbon solvent is a mineral oil cut of low aromatic content with a boiling range of 140-180° C.

10. A method as claimed in claim 1, wherein transesterification is performed at a temperature of 60-140° C. under a pressure sufficient to maintain the C1-C4 alcohol in the liquid state.

11. A method as claimed in claim 10, wherein the temperature range is 95-115° C.

12. A method as claimed in claim 1, wherein the C1-C4 alcohol is methanol.

13. A method as claimed in claim 1, wherein the refined vegetable oil is obtained by thoroughly admixing unit volume of a non-refined vegetable oil with at least 0.2 parts by volume of an aliphatic hydrocarbon solvent with a boiling point of −42° C. to 200° C. with 0.07-0.2 parts by volume of aqueous glycerol comprising 5-40% by volume of water, allowing the mixture to settle to form a lower polar phase and an upper apolar phase and removing said lower polar phase to leave refined vegetable oil and aliphatic hydrocarbon solvent.

14. A method as claimed in claim 1, wherein the refined vegetable oil is obtained by feeding partially refined vegetable oil mixed with an aliphatic hydrocarbon solvent having a boiling point in the range from −42° C. to 200° C. into a lower zone of a counter current packed column apparatus, and feeding an alcohol into at least one higher zone of column, allowing the feed streams to interact, and collecting the raffinates stream at the top of the column.

15. A method as claimed in claim 14, wherein the column packing includes an ion exchange resin.

16. A method as claimed in claim 15, wherein the alcohol stream includes a catalyst.

17. A method as claimed in claim 14, wherein the alcohol is glycerol.

18. A method as claimed in claim 1, wherein water introduced during refining operations is removed by subjecting the biofuel phase to azeotropic distillation in the presence of the aliphatic hydrocarbon solvent.

19. A biodiesel fuel production method comprising:
   (a) charging a single vessel consisting of a counter current packed column apparatus with a charge of:
       a refined vegetable oil;
       a C1-C4 alcohol;
       a catalyst, and
       at least 0.2 parts by volume, related to unit volume of refined vegetable oil, of an aliphatic hydrocarbon solvent with a boiling point of −42° C. to 200° C.,
       wherein said charging step comprises feeding the refined vegetable oil mixed with the aliphatic hydrocarbon solvent into a lower zone of said column apparatus and feeding the alcohol and catalyst into at least one higher zone of the column apparatus;
   (b) mixing the oil, alcohol, catalyst and solvent in said single vessel under homogeneous conditions without stopping transesterification to remove by-product polar glycerol, and further transesterification without subjecting the mixture with additional alcohol and catalyst, and
   (c) withdrawing converted biodiesel fuel product in said single vessel from a top zone of the column apparatus.

20. A method as claimed in claim 19, wherein 0.3-1 parts by volume of aliphatic hydrocarbon solvent is used per unit volume of refined vegetable oil.

21. A method as claimed in claim 19, wherein 1.05 to 2.0 parts by volume of reactant alcohol are used per unit volume of refined vegetable oil.

22. A method as claimed in claim 19, wherein the aliphatic hydrocarbon solvent is a substance with a boiling point of 60-180° C. or a mixture of such substances.

23. A method as claimed in claim 19, wherein the aliphatic hydrocarbon solvent is a mineral oil cut of low aromatic content with a boiling range of 60-100° C.

24. A method as claimed in claim 19, wherein transesterification is performed at a temperature of 60-140° C. under a pressure sufficient to maintain the C1-C4 alcohol in the liquid state.

25. A method as claimed in claim 19, wherein the C1-C4 alcohol is methanol.

26. A method as claimed in claim 19, wherein the refined vegetable oil is obtained by thoroughly admixing unit volume of a non-refined vegetable oil with at least 0.2 parts by volume of an aliphatic hydrocarbon solvent with a boiling point of −42° C. to 200° C. with 0.07-0.2 parts by volume of aqueous glycerol comprising 5-40% by volume of water, allowing the mixture to settle to form a lower polar phase and an upper apolar phase and removing said lower polar phase to leave refined vegetable oil and aliphatic hydrocarbon solvent.

27. A method as claimed in claim 19, wherein the refined vegetable oil is obtained by feeding partially refined vegetable oil mixed with an aliphatic hydrocarbon solvent having a boiling point in the range from −42° C. to 200° C. into a lower zone of a counter current packed column apparatus, and feeding an alcohol into at least one higher zone of the column, allowing the feed streams to interact, and collecting the raffinates stream at the top of the column.

28. A method as claimed in claim 27, wherein the column packing includes an ion exchange resin.

29. A method as claimed in claim 28, wherein the alcohol stream includes a catalyst.

30. A method as claimed in claim 27, wherein the alcohol is glycerol.

31. A method as claimed in 19, wherein water introduced during refining operations is removed by subjecting the biofuel phase to azeotropic distillation in the presence of the aliphatic hydrocarbon solvent.

\* \* \* \* \*